(12) United States Patent
Hiraguchi (10) Patent No.: US 7,028,938 B2
(45) Date of Patent: Apr. 18, 2006

(54) RECORDING TAPE CARTRIDGE (75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/916,432

(22) Filed: Aug. 12, 2004

(65) Prior Publication Data

US 2005/0051656 A1    Mar. 10, 2005

(30) Foreign Application Priority Data

Sep. 9, 2003  (JP) .............................. 2003-316585

(51) Int. Cl.
*G11B 15/66* (2006.01)

(52) U.S. Cl. ................ 242/332.4; 242/348; 242/532.1; 360/132

(58) Field of Classification Search ............. 242/332.4, 242/348, 348.2, 532.1; 360/132
See application file for complete search history.

(56) References Cited

U.S. PATENT DOCUMENTS 4,452,406 A    6/1984  Richard

| 4,977,474 A | * | 12/1990 | Oishi et al. | ............... | 242/348.2 |
|---|---|---|---|---|---|
| 5,465,187 A | * | 11/1995 | Hoge et al. | .................. | 360/132 |
| 6,349,892 B1 | * | 2/2002 | Morita et al. | ................. | 360/132 |
| 6,490,133 B1 | * | 12/2002 | Okamura et al. | ............ | 360/132 |
| 6,547,174 B1 | * | 4/2003 | Kaneda et al. | ............ | 242/348.2 |
| 6,860,444 B1 | * | 3/2005 | Alexander | ............... | 242/348.2 |
| 6,874,721 B1 | * | 4/2005 | Aaron et al. | .............. | 242/348.2 |

FOREIGN PATENT DOCUMENTS

JP       2002-298541 A    10/2002

\* cited by examiner

*Primary Examiner*—William A. Rivera
(74) *Attorney, Agent, or Firm*—Sughrue Mion, PLLC (57) ABSTRACT

A recording tape cartridge has: a case which is substantially rectangular and which rotatably accommodates a single reel on which a recording tape is wound; an opening for pulling-out of the recording tape, the opening being formed in a wall surface of the case at a side of loading into a drive device other than at a corner portion of the case; a leader block fixed to an end portion of the recording tape, and pulled-out by a pull-out member of the drive device, and able to close the opening; and a position restricting portion disposing the leader block at an inner side of the wall surface and parallel to the wall surface.

19 Claims, 10 Drawing Sheets

RECORDING TAPE CARTRIDGE

CROSS-REFERENCE TO RELATED APPLICATION

This application claims priority under 35 USC 119 from Japanese Patent Application No. 2003-316585, the disclosure of which is incorporated by reference herein.

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback (read/write) medium mainly for computers or the like.

2. Description of the Related Art

Conventionally, recording tape cartridges (magnetic tape cartridges) have been known in which a magnetic tape, which serves as a recording tape and which is used as a data recording/playback medium for computers or the like, is wound on a single reel, and the reel is accommodated within a case formed of a synthetic resin. A leader member such as a leader pin, a leader tape, or a leader block is fixed to the distal end (the free end) of the magnetic tape. A pull-out means provided at a drive device pulls the leader member out from an opening of the recording tape cartridge, and causes the magnetic tape fixed thereto to be taken-up onto a take-up reel of the drive device.

A circular opening is formed in the bottom surface of the recording tape cartridge. A reel gear is formed in an annular form at the center of the bottom surface of the reel which is exposed from this opening. The reel is driven to rotate by a driving gear, which is provided at a driving shaft of the drive device, meshing with the reel gear. Accordingly, by rotating the reel of the recording tape cartridge synchronously with the take-up reel of the drive device, data can be recorded onto the magnetic tape, or data recorded on the magnetic tape can be played back.

In a recording tape cartridge having such a structure, the leader member is a connecting member which connects the magnetic tape to the take-up reel of the drive device in the state in which the magnetic tape is drawn-out. However, the position of the opening formed in the case, and the type of the door or the like which opens and closes the opening, differ for each type of leader member. For example, in a case in which a leader block is used, the opening is formed in a corner portion at the side in the direction of loading the recording tape cartridge (the case) into a drive device, and the leader block is anchored so as to close the opening. Namely, the leader block is structured so as to function also as a door which closes the opening.

Because such a leader block is formed as a rigid body, as compared with a leader tape which is in the form of a tape, there are the advantages that the operation of engaging with the pull-out means of a drive device can be carried out easily and it is difficult for the engaging portion thereof to become worn or to be broken. Further, when the opening is at a corner portion of the case, there is the advantage that the pull-out angle of the leader block can be freely designed at the drive device. For example, the pull-out angle can be designed such that the leader block is pulled out over the shortest distance with respect to the take-up reel, and can be designed such that the operation of pulling out the magnetic tape is completed in a short time.

However, when the leader block is anchored at a corner portion of the recording tape cartridge (the case), if an impact is applied to that corner portion due to the recording tape cartridge being dropped or the like when the recording tape cartridge is not in use (is not loaded in a drive device), there is the problem that the case flexurally deforms, and it is easy for the leader block to come off of the corner portion.

When there is the concern that the leader block may come off of and fall out from the case due to the recording tape cartridge being dropped or the like, the user is led to fear that the functions of the recording tape cartridge itself may be affected, and fear that the recording tape cartridge may not operate in a drive device even if repaired manually. Moreover, when the recording tape cartridge is actually dropped, there are cases in which the leader block comes off from the case, and creases are formed in the magnetic tape. In addition, if the leader block inadvertently comes off, because the leader block itself functions as a door, there is the problem that the dustproof quality of the recording tape cartridge will be insufficient.

Therefore, conventionally, it has been thought to, for example, purposely mold the corner portion in a configuration which easily flexurally deforms, and thereby mitigate the impact due to a drop or the like, and keep the effects on the leader block to a minimum. However, this structure alone is insufficient as a countermeasure for preventing the leader block from coming out from the case.

Figure 10:
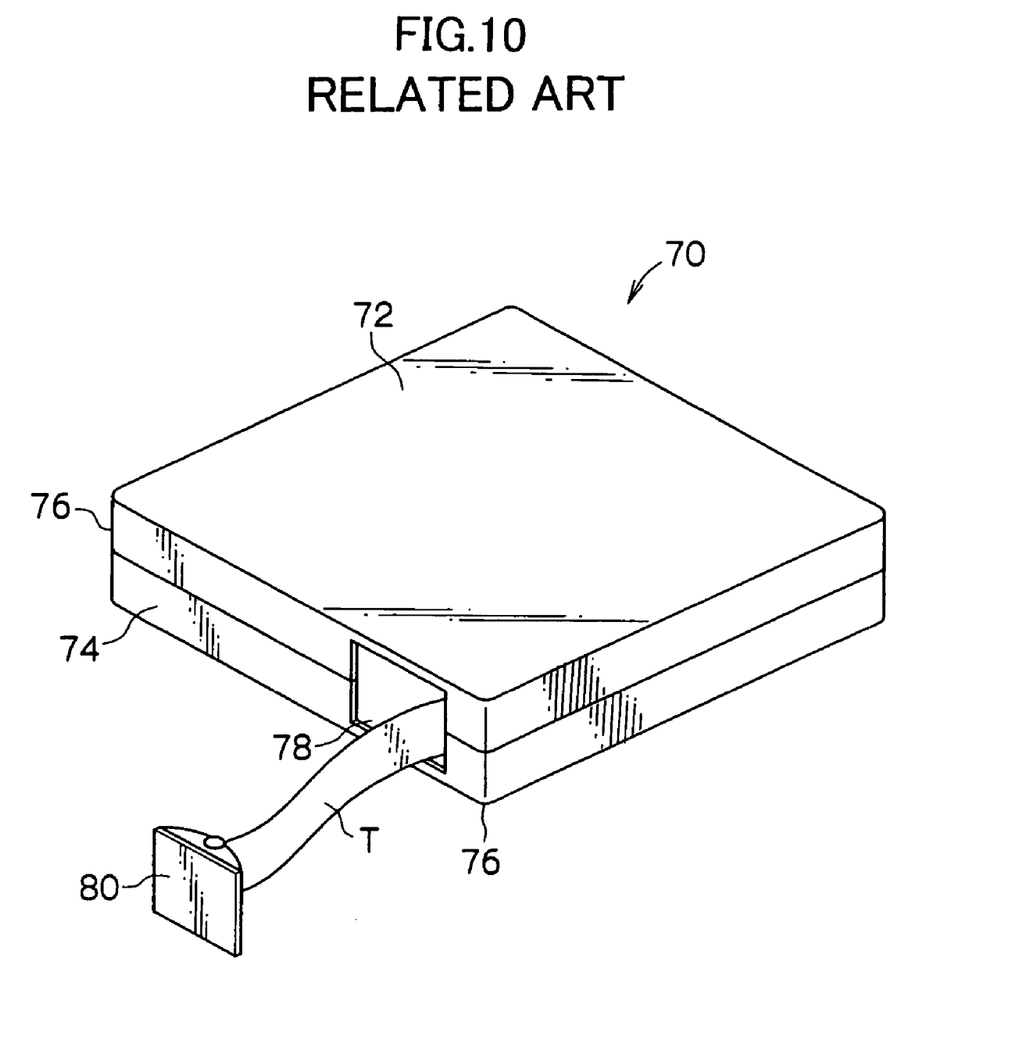
FIG. 10 is a schematic perspective view, as seen from above, of a conventional recording tape cartridge.

Thus, as shown in FIG. 10 for example, it has been thought to form an opening 78 in a peripheral wall 74 at the side in the direction of loading a recording tape cartridge 70 (a case 72) into a drive device, at a position other than a corner portion 76, and to anchor a leader block 80 so as to close the opening 78 (see, for example, Japanese Patent Application Laid-Open (JP-A) No. 2002-298541). With such a structure, even if, due to dropping or the like, an impact is applied to the corner portion 76 and the case 72 flexurally deforms, it is difficult for the leader block 80 to come out from the opening 78 because the opening 78 is provided at a position which is set apart from the corner portion 76.

However, when the leader block 80 shown in FIG. 10 closes the opening 78, the leader block 80 is flush with the peripheral wall 74, and is anchored so as to structure a portion of the peripheral wall 74. Therefore, there are the problems that the size of the opening 78 must be formed so as to match the size of the leader block 80, and that, when the recording tape cartridge 70 is not in use, it is easy for the leader block 80 to be scratched or the like because it is always in a state of being exposed to the exterior. Because the leader block 80 is a connecting member which is connected to the take-up reel of a drive device as described above, it is not preferable for the dimensional accuracy thereof to be disturbed due to damage or the like.

SUMMARY OF THE INVENTION

The present invention was developed to provide a recording tape cartridge from which it is difficult for a leader block to come out even if the impact is received at a case due to a drop or the like, and in which there is little fear that the leader block will be damaged when the recording tape cartridge is not in use.

A recording tape cartridge of a first aspect of the present invention has: a case which is substantially rectangular and which rotatably accommodates a single reel on which a recording tape is wound; an opening for pulling-out of the recording tape, the opening being formed in a wall surface of the case at a side of loading into a drive device other than at a corner portion of the case; a leader block fixed to an end portion of the recording tape, and pulled-out by a pull-out member of the drive device, and able to close the opening; and a position restricting portion disposing the leader block at an inner side of the wall surface and parallel to the wall surface.

In the first aspect, the opening is formed in the wall surface other than at the corner portion. Therefore, the leader block also is disposed at a position which is set apart from the corner portion. Accordingly, even if the recording tape cartridge is dropped from a corner portion, it is difficult for the leader block to come out therefrom, and accordingly, the user does not worry that the leader block will inadvertently come out.

Moreover, because the leader block is, due to the position restricting portion, disposed at the inner side of the wall surface at the side of loading into a drive device, the leader block does not project out from the wall surface. Accordingly, there is little concern that the leader block will be damaged when the recording tape cartridge is not in use. Moreover, the leader block is, due to the position restricting portion, disposed parallel to the wall surface at the side of loading into a drive device. Therefore, the opening can be made to be large, and the pull-out angle of the pull-out member of the drive device can be made to be large. Namely, because the degrees of freedom in the designing of the drive device can be increased, it is possible to carry out designing such that, for example, the leader block is pulled-out over the shortest distance with respect to the take-up reel of the drive device, and the operation of pulling-out the recording tape can be completed in a short period of time.

DETAILED DESCRIPTION OF THE INVENTION

Hereinafter, an embodiment of the present invention will be described in detail on the basis of the example illustrated in the drawings. Note that, for convenience of explanation, the direction of loading a recording tape cartridge 10 into a drive device is denoted by arrow A, and this direction is the front direction (the front side) of the recording tape cartridge 10. Further, the direction of arrow B, which is orthogonal to the direction of arrow A, denotes the rightward direction (the right side).

Figure 1:
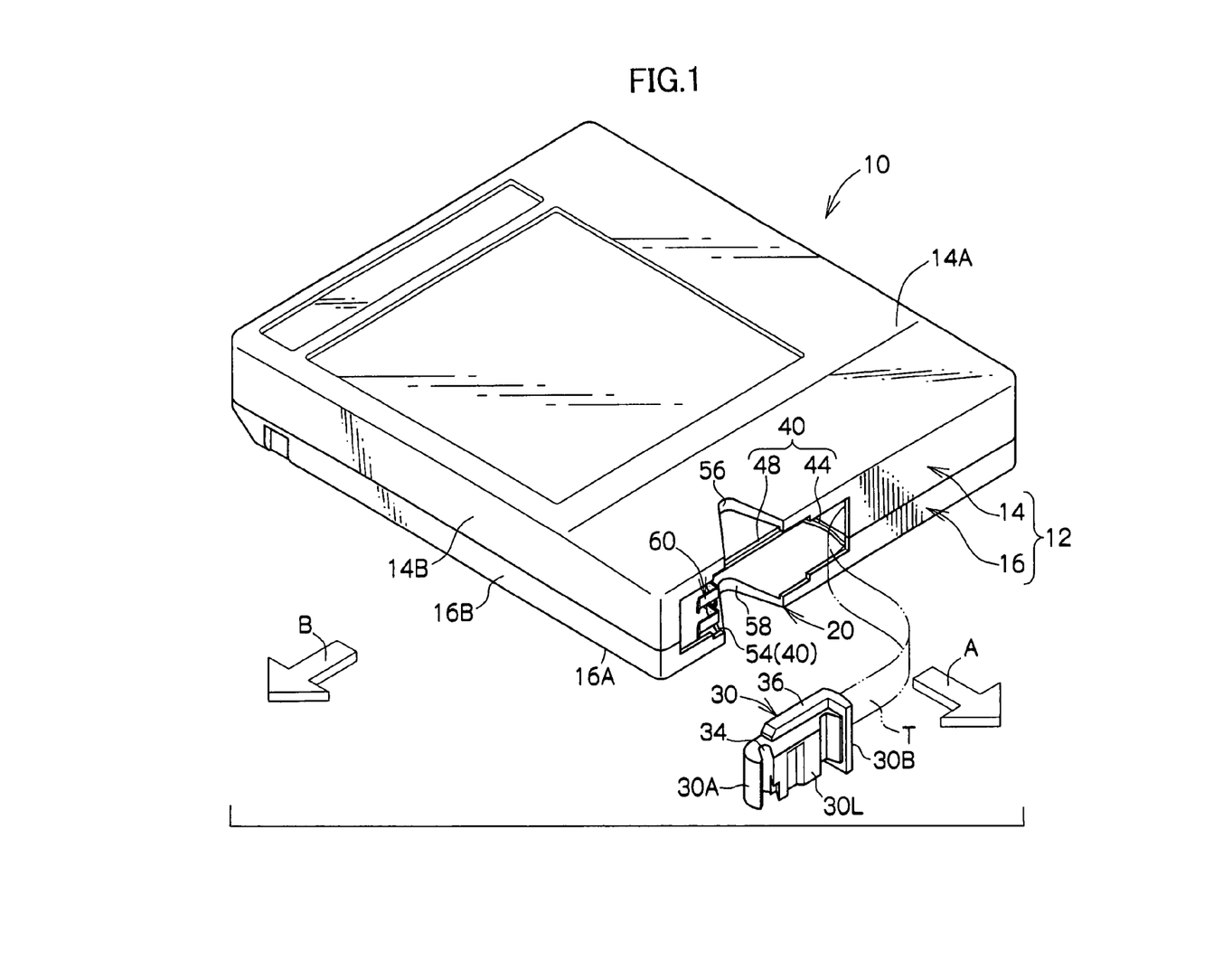
FIG. 1 is a schematic perspective view, as seen from above, of a recording tape cartridge.
Figure 2:
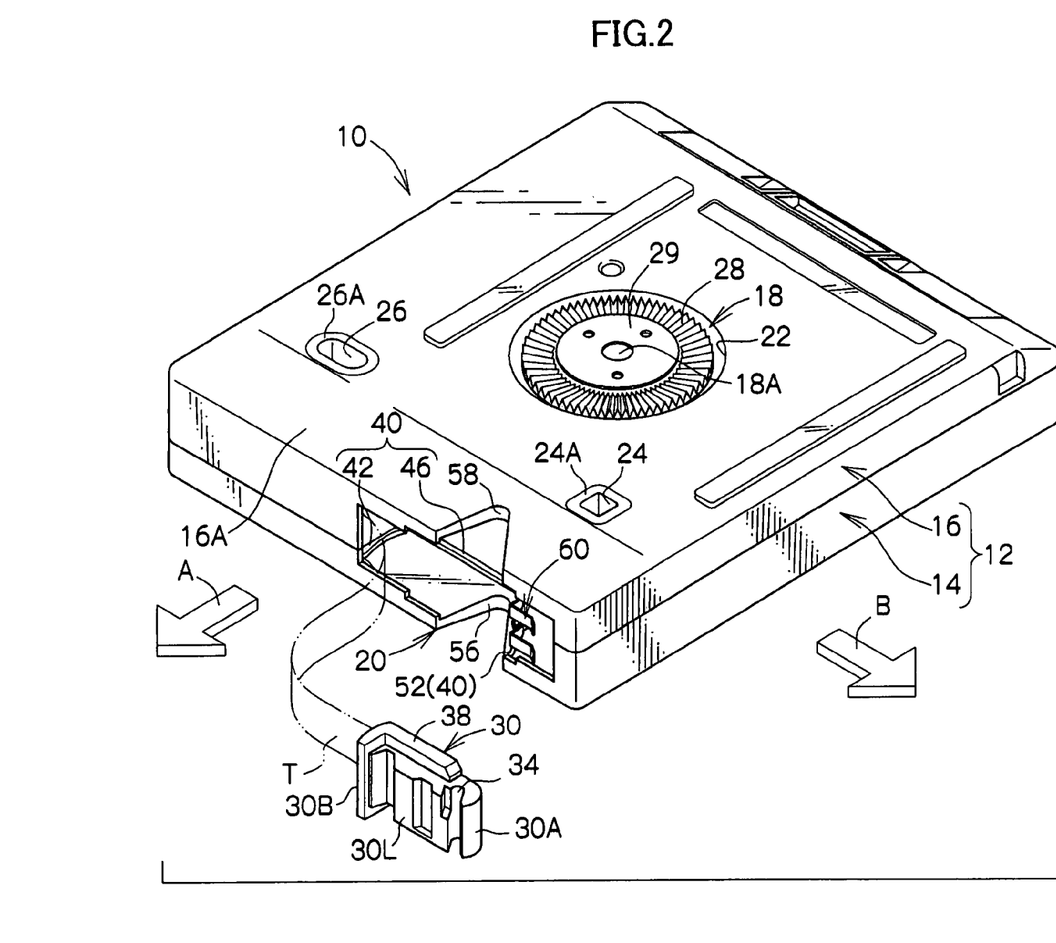
FIG. 2 is a schematic perspective view, as seen from below, of the recording tape cartridge.
Figure 3:
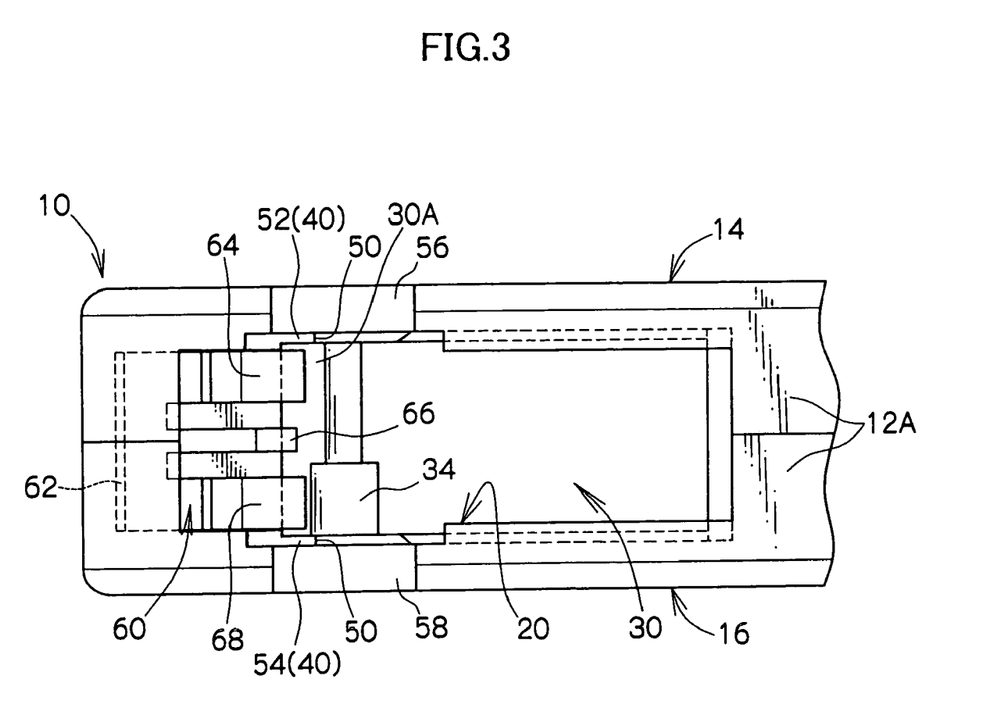
FIG. 3 is a schematic front view, as seen from the front, of a vicinity of an opening of the recording tape cartridge.

As shown in FIGS. 1 through 3, the recording tape cartridge 10 has a case 12 which is formed of synthetic resin. The case 12 is structured by an upper case 14 and a lower case 16 being joined together. Specifically, the upper case 14 is structured by a substantially frame-shaped peripheral wall 14B standing erect along the outer edge of a ceiling plate 14A which is substantially rectangular in plan view. The lower case 16 is structured by a peripheral wall 16B standing erect along the outer edge of a floor plate 16A which has a shape substantially corresponding to that of the ceiling plate 14A.

The case 12 is formed substantially in the shape of a rectangular box, by the upper case 14 and the lower case 16 being joined together by screws in a state in which the open end of the peripheral wall 14B and the open end of the peripheral wall 16B abut one another. Note that it is preferable to provide a screw boss 15 (see FIG. 5) at this time at least in a vicinity of each corner portion. In accordance with such a structure, the upper case 14 and the lower case 16 can be joined together strongly. Note that the means for joining the upper case 14 and the lower case 16 together is not limited to screws, and the upper case 14 and the lower case 16 may be joined together by ultrasonic welding or the like.

An opening 20 is formed in the case 12 at a predetermined position of a peripheral wall 12A at the side in the direction of loading the recording tape cartridge 10 into a drive device (hereinafter called "front wall 12A"), i.e., at a position of the front wall 12A which is set apart from the right corner portion toward the left corner portion at least by a length which is greater than or equal to the plate thickness of the case 12. The opening 20 is for the pulling-out to the exterior of a magnetic tape T which is wound on a reel 18 which will be described later. In this way, when the opening 20 is formed in the peripheral wall (the front wall 12A) at a position other than at the corner portion, a leader block 30 which will be described later is disposed at a position which is set apart from the corner portion. Therefore, even if the recording tape cartridge 10 is dropped from a corner portion thereof, it is difficult for the leader block 30 to come out from the case 12.

A gear opening 22, which is circular and which passes through the floor plate 16A, is provided in a substantially central portion of the floor plate 16A, and is for exposing a reel gear 28 formed at the reel 18. Note that an annular rib (not illustrated) is formed to project toward the interior of the case 12 at the peripheral edge portion of the gear opening 22 at the floor plate 16A. Due to the outer peripheral side of the reel gear 28 being set on this annular rib when the recording tape cartridge 10 is not being used, the reel 18 is positioned with respect to the lower case 16.

A pair of positioning holes 24 and 26 are formed in the outer surface of the floor plate 16A of the case 12, in a vicinity of the front end. The pair of positioning holes 24 and 26 are formed in the shapes of bags within projecting portions (not illustrated) which stand erect from the floor plate 16A toward the interior of the case 12. The positioning holes 24 and 26 are disposed so as to be separated from one another on an imaginary line which is orthogonal to the loading direction. The positioning hole 24, which is the positioning hole that is closer to the opening 20, is formed in a substantially square shape, as seen in bottom view, which circumscribes a positioning pin (not illustrated) of a drive device. The positioning hole 26 is a long hole whose longitudinal direction runs along the aforementioned imaginary line, and whose width corresponds to the diameter of a positioning pin (not illustrated) of the drive device. Accordingly, when the recording tape cartridge 10 is loaded into a drive device and positioning pins are inserted into the respective positioning holes 24 and 26, the recording tape cartridge 10 is correctly positioned in the horizontal directions (the left/right direction and the front/back direction) within the drive device.

The portions of the floor plate 16A around the positioning holes 24 and 26 are reference surfaces 24A and 26A which are finished so as to be smoother than the other portions of the floor plate 16A (the design surface of the floor plate 16A). When the positioning pins are inserted into the positioning holes 24 and 26, the reference surfaces 24A and 26A abut positioning surfaces (not illustrated) of the drive device which are provided around the positioning pins. In this way, the vertical direction positioning of the recording tape cartridge 10 within the drive device is carried out. Note that the positioning holes 24 and 26 are not limited to the illustrated positions, and either one may be provided at the rear side. Namely, the positioning holes 24 and 26 may be provided substantially on a diagonal line of the floor plate 16A (i.e., in the vicinity of a diagonal line).

Only one reel 18 is rotatably accommodated within the above-described case 12. The magnetic tape T, which serves as a recording tape, is wound around the reel 18. The reel gear 28 is formed in an annular form in the bottom surface of the reel 18. The reel gear 28 can mesh with a driving gear (not illustrated) provided at the distal end of a rotating shaft (not illustrated) of a drive device. A reel plate 29, which is an annular plate formed of a magnetic material, is fixed coaxially and integrally by insert molding or the like at the inner side of the reel gear 28.

Figure 4:
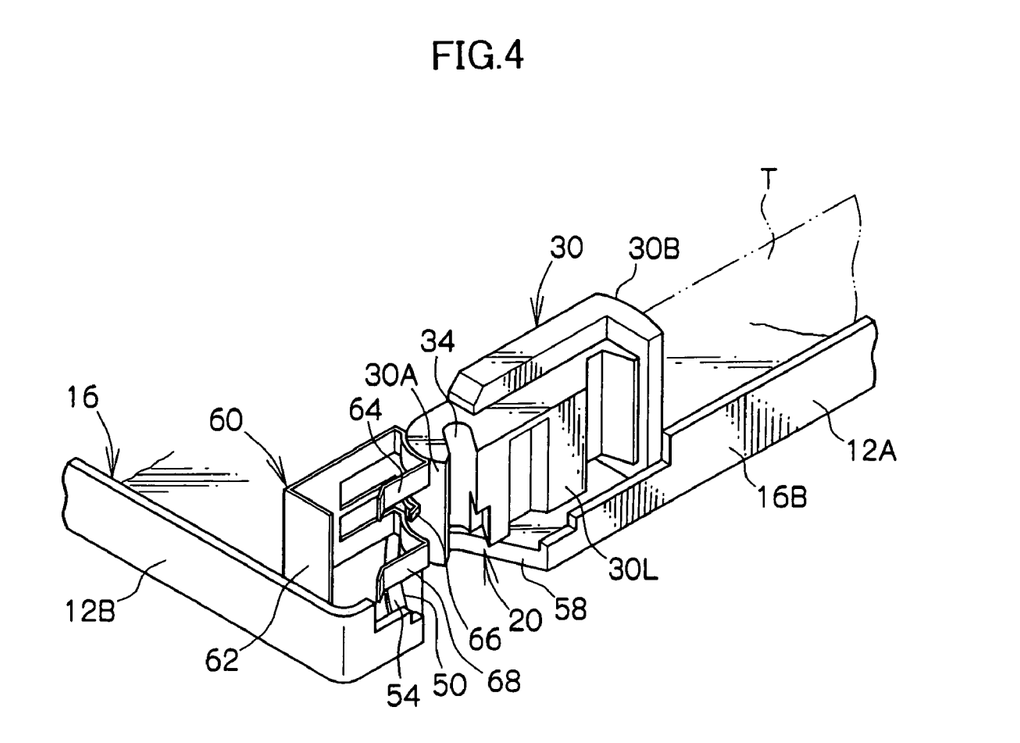
FIG. 4 is a schematic perspective view showing a leader block which is anchored at an inner side of the opening.
Figure 5:
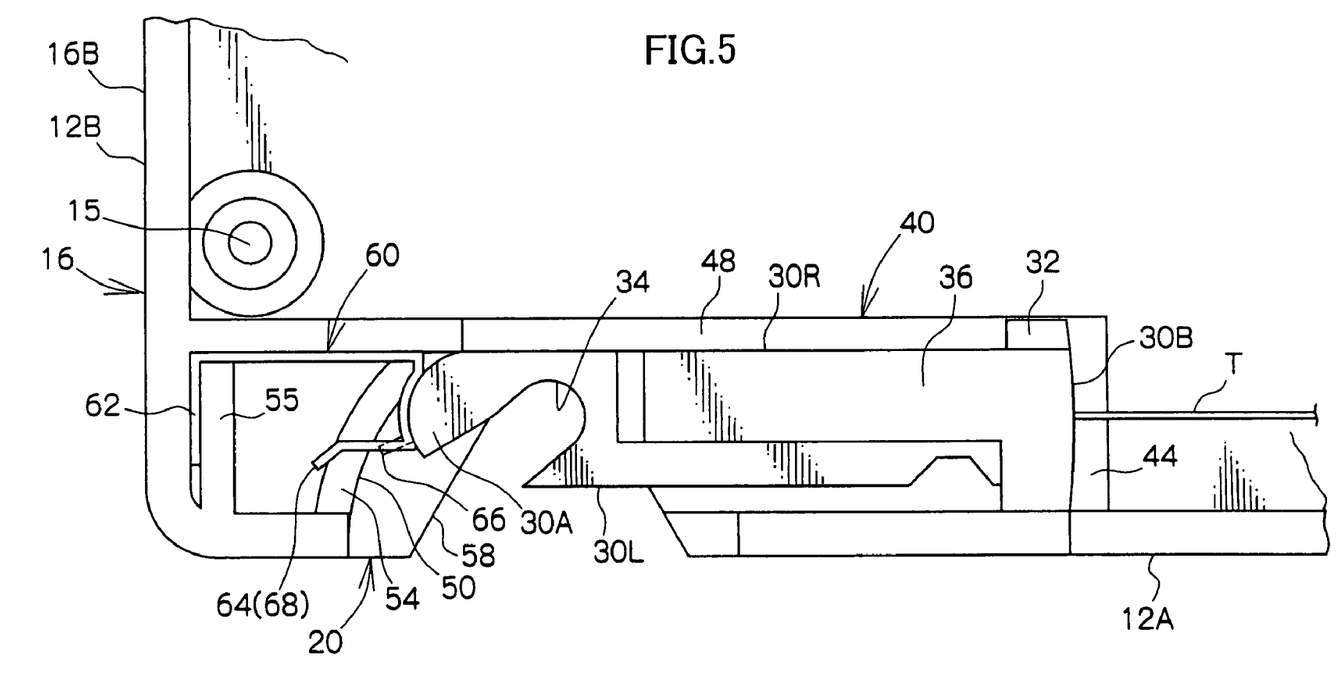
FIG. 5 is a schematic plan view showing the leader block which is anchored at the inner side of the opening.

Further, as shown in FIGS. 4 and 5 as well, the leader block 30, which is for pulling-out of the magnetic tape T, is attached to the distal end of the magnetic tape T. Namely, a fit-together recess (not illustrated) which is substantially rectangular in side view is formed from a right side surface 30R to a rear end 30B of the leader block 30. Due to a substantially rectangular fit-together member 32 fitting-together with this fit-together recess while the distal end portion of the magnetic tape T is nipped therebetween, the leader block 30 is fixed to the distal end of the magnetic tape T. Accordingly, the width (the length in the heightwise direction) of the fit-together member 32 is the same as or is slightly larger than the width of the magnetic tape T.

The rear end 30B of the leader block 30 is formed as an arc-shaped surface which structures a portion of a take-up surface around which the magnetic tape T is taken-up, when the leader block 30 is fit-in in a take-up reel (not illustrated) of a drive device. The magnetic tape T is attached to the substantial center of the rear end 30B. Further, a front end 30A of the leader block 30 is formed in a substantial arc-shape as seen in plan view. An engaging recess 34, with which a pull-out member 90 (see FIGS. 8 and 9) structuring pull-out means of the drive device engages, is formed in a vicinity of the front end 30A. The engaging recess 34 is structured by a curved surface, which is substantially semi-circular in plan view, and a straight line connected thereto.

Further, as shown in FIG. 5, fit-together ribs 42 and 44, which are integrally continuous from the left side edge portion of the opening 20 toward the rear, stand erect to heights such that the fit-together ribs 42 and 44 do not interfere with the magnetic tape T, at the inner surface of the ceiling plate 14A of the upper case 14 and the inner surface of the floor plate 16A of the lower case 16. (In FIG. 5, only the fit-together rib 44 is illustrated.) An arc-shaped surface, which coincides with the outer configuration of the rear end 30B of the leader block 30, is formed at the right side surface of each of the fit-together ribs 42 and 44.

Engaging ribs 46 and 48, which are continuous integrally and perpendicularly from the rear ends of the fit-together ribs 42 and 44 to a right wall 12B, stand erect to heights such that the engaging ribs 46 and 48 do not interfere with the magnetic tape T. (In FIG. 5, only the engaging rib 48 is illustrated.) Note that portions of the engaging ribs 46 and 48 from predetermined positions thereof to the right wall 12B sides thereof are formed to stand to heights which are the same as those of the peripheral walls 14B and 16B, so as to impede entry of dust and the like in from between spring anchor portions 64, 66 and 68 of an anchor member 60 which will be described later. Guide ribs 52 and 54, which are continuous integrally and in substantial arc-shapes as seen in plan view from predetermined positions of the engaging ribs 46 and 48 to the right side edge portion of the opening 20 (the front wall 12A), stand erect to heights such that the guide ribs 52 and 54 do not interfere with the anchor member 60 which will be described later. (In FIG. 5, only the guide rib 54 is illustrated.)

The left side surfaces of the guide ribs 52 and 54 which face the opening 20, and the side surfaces (front surfaces) of the engaging ribs 46 and 48 facing the opening 20, are guide surfaces 50 which guide the posture of the leader block 30 to be parallel to the front wall 12A. A position restricting portion 40, which makes the leader block 30 be disposed parallel to the front wall 12A, is structured by the guide ribs 52 and 54, the engaging ribs 46 and 48, and the fit-together ribs 42 and 44.

Figure 6:
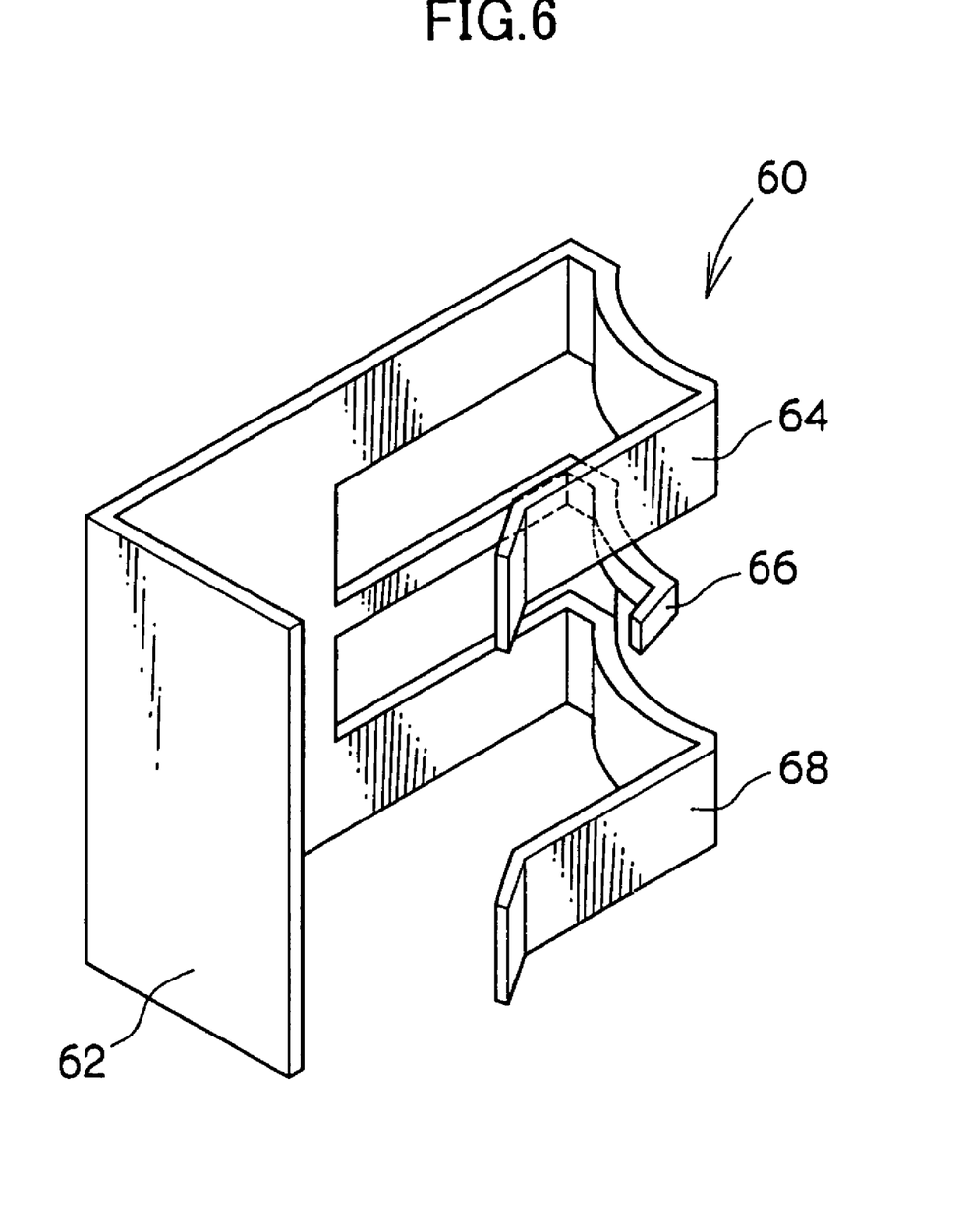
FIG. 6 is a perspective view of an anchor member.
Figure 7A:
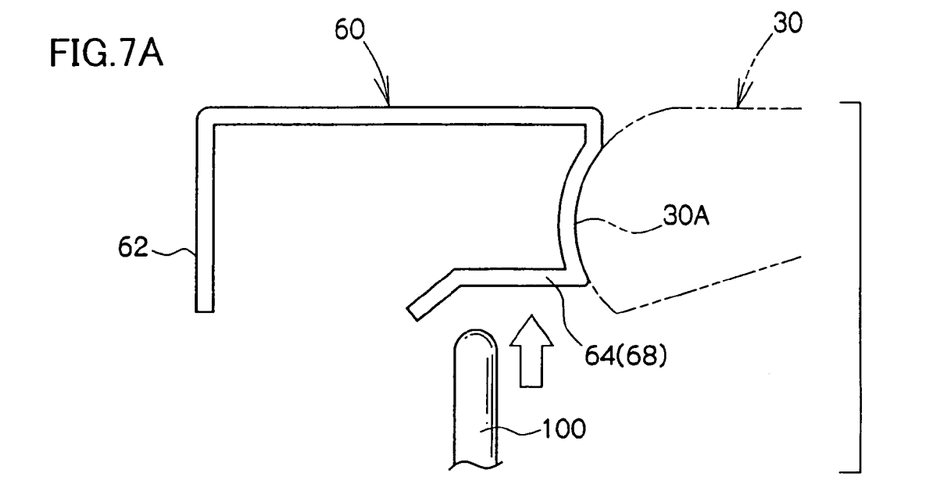
FIG. 7A is a schematic view for explaining operation of the anchor member.
Figure 7B:
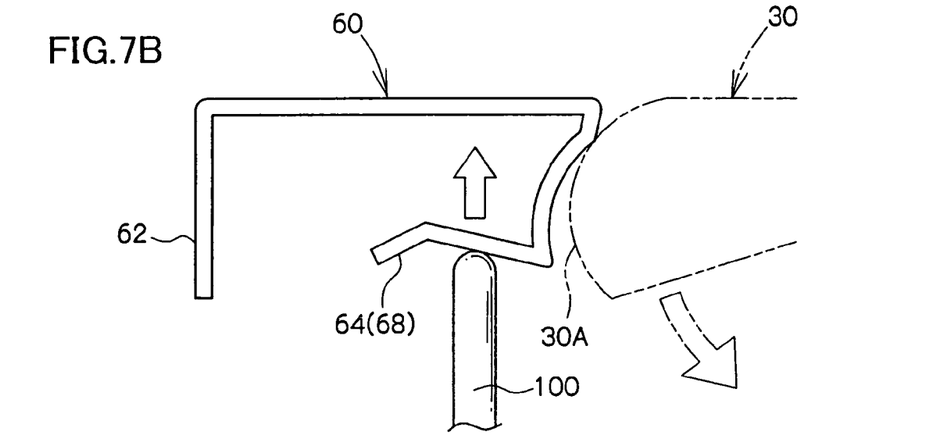
FIG. 7B is a schematic view for explaining operation of the anchor member.
Figure 7C:
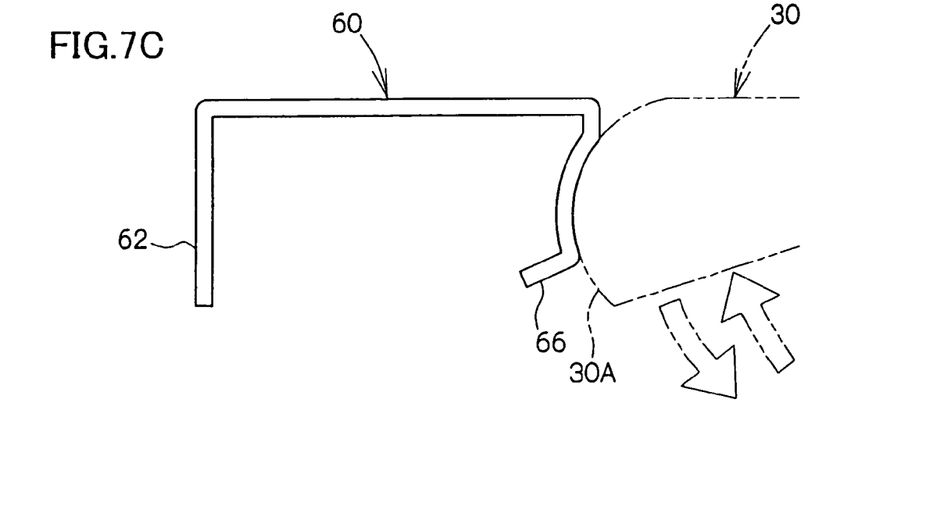
FIG. 7C is a schematic view for explaining operation of the anchor member.

The anchor member 60, which anchors the front end 30A of the leader block 30, is disposed between the guide rib 52 and the guide rib 54. The anchor member 60 is shaped as a plate spring formed of metal or resin. As shown in FIGS. 5 through 7, the anchor member 60 is structured by a base portion 62 and the spring anchor portions 64, 66 and 68. The base portion 62 is nipped and fixed between the right wall 12B and ribs 55 which stand erect at the ceiling plate 14A of the upper case 14 and the floor plate 16A of the lower case 16. The spring anchor portions 64, 66 and 68 are bent perpendicularly from the base portion 62, and are formed, from portions along the lengths thereof, in the shapes of three long and thin plate pieces.

The distal ends of the spring anchor portions 64, 66 and 68 are bent perpendicularly so as to oppose the base portion 62. Portions of the spring anchor portions 64, 66 and 68 which are further toward the distal end sides than these bent regions thereof are formed in substantial arc-shapes as seen in plan view, so as to match the outer configuration of the front end 30A of the leader block 30. Portions of the spring anchor portions 64, 66 and 68 which are further toward the distal end sides than these regions formed in substantial arc-shapes in plan view, are again bent substantially perpendicularly toward the base portion 62. The top and bottom spring anchor portions 64 and 68 at the both sides of the central spring anchor portion 66 are formed so as to extend longer than the central spring anchor portion 66. This is because a releasing member 100 of the drive device abuts the top and bottom spring anchor portions 64 and 68.

Namely, the forces pressing the leader block 30 are different at, on the one hand, the top and bottom spring anchor portions 64 and 68, and at, on the other hand, the central spring anchor portion 66. As shown in FIG. 7C, the central spring anchor portion 66 is for so-called provisionary stopping, in which the central spring anchor portion 66 anchors the front end 30A of the leader block 30 by a force to an extent that the pull-out member 90 (see FIGS. 8 and 9) of the drive device can easily remove the front end 30A (can easily engage with the front end 30A when the leader block 30 is made to return).

On the other hand, as shown in FIG. 7A, the top and bottom spring anchor portions 64 and 68 are structured so as to push the front end 30A of the leader block 30 at a force which is stronger than that of the central spring anchor portion 66. When the leader block 30 is removed from the case 12, as shown in FIG. 7B, the releasing member 100 pushes and flexurally deforms the top and bottom spring anchor portions 64 and 68, so as to cancel their anchoring of the front end 30A such that the leader block 30 can be removed. Accordingly, although the top and bottom spring anchor portions 64 and 68 are formed to be longer than the central spring anchor portion 66, the anchor member 60 is not limited to the illustrated structure. However, structuring the anchor member 60 in this way is preferable because the structure thereof can be made simple.

In this way, at times when the recording tape cartridge 10 is not being used, as shown in FIGS. 3 through 5, in the state in which a left side surface 30L of the leader block 30 faces the exterior, the front end 30A is anchored by the anchor member 60, and the top and bottom both ends including projecting portions 36 and 38 of the right side surface 30R (the outer sides further toward the top and bottom than the fit-together member 32) abut the engaging ribs 46 and 48, and the rear end 30B is fit-together with the fit-together ribs 42 and 44, and the leader block 30 is accommodated and held at the inner side of the opening 20 of the case 12. In this state, the opening 20 is closed by the leader block 30, and entry of dust and the like into the case 12 is prevented.

Note that cut-out portions 56 and 58, which, in plan view, are wider than the engaging recess 34, are formed at the top and bottom side edge portions of the opening 20, i.e., in the ceiling plate 14A of the upper case 14 and in the floor plate 16A of the lower case 16 structuring the opening 20, at positions opposing the engaging recess 34 when the leader block 30 closes the opening 20. Accordingly, when the leader block 30 is pulled out, the pull-out member 90 of the drive device can easily engage with the engaging recess 34 due to the cut-out portions 56 and 58.

Operation of the recording tape cartridge 10 having the above-described structure will now be described. When the recording tape cartridge 10 is not being used (i.e., is not loaded in a drive device, such as is being stored or transported or the like), the opening 20 is closed by the leader block 30. The opening 20 is formed at the front wall 12A at a position thereof other than the corner portion. The leader block 30 is accommodated and held by the position restricting portion 40 and the anchor member 60 at the inner side of the opening 20, so as to be parallel to the front wall 12A. Accordingly, it is difficult for the leader block 30 to become scratched or the like, and even if the recording tape cartridge 10 is accidentally dropped, it is difficult for the leader block 30 to come out from the opening 20.

When the recording tape cartridge 10 is to be used, it is loaded into a drive device along the direction of arrow A with the front wall 12A side thereof leading. When the recording tape cartridge 10 is loaded (inserted) in a drive device, either the recording tape cartridge 10 is lowered by a predetermined height or the rotating shaft (not illustrated) provided at the drive device is raised by a predetermined height. The positioning pins of the drive device are inserted in the positioning holes 24 and 26 such that the position in the horizontal direction (the front/back and left/right directions) is prescribed, and the positioning surfaces of the drive device abut the reference surfaces 24A and 26A such that the position in the heightwise direction is prescribed. In this way, the recording tape cartridge 10 is positioned accurately within the drive device.

Figure 8A:
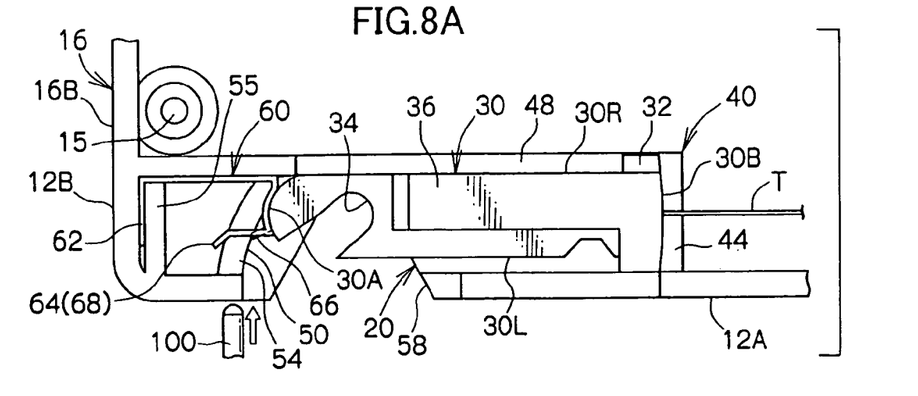
FIG. 8A is a schematic view for explaining operation, which shows a process of removing the leader block from the opening.
Figure 8B:
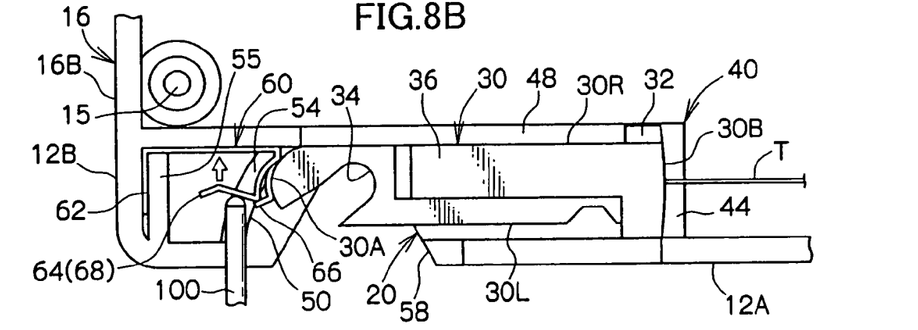
FIG. 8B is a schematic view for explaining operation, which shows the process of removing the leader block from the opening.

When the recording tape cartridge 10 is loaded (inserted) in a drive device, as shown in FIGS. 8A and 8B, the releasing member 100 projecting at the drive device relatively pushes the spring anchor portions 64 and 68 in toward the interior (the rear) of the case 12. Note that, in a case in which the rotating shaft (not illustrated) provided at the drive device is raised by a predetermined height, the releasing member 100 is mounted in a fixed state, but in a case in which the recording tape cartridge 10 is lowered by a predetermined height, the releasing member 100 is structured so as to move downward.

Figure 8C:
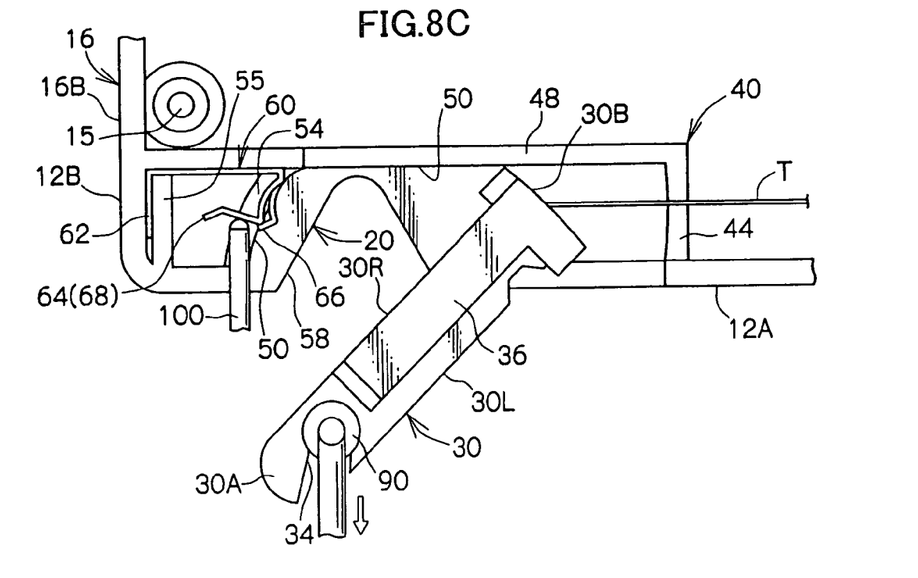
FIG. 8C is a schematic view for explaining operation, which shows the process of removing the leader block from the opening.

Next, the pull-out member 90 of the drive device engages with the engaging recess 34 of the leader block 30. At this time, because the recording tape cartridge 10 is positioned accurately within the drive device and the cut-out portions 56 and 58 are formed in the case 12, the pull-out member 90 can reliably and easily engage with the engaging recess 34 of the leader block 30. Then, as shown in FIG. 8C, due to the pull-out member 90 moving toward the take-up reel within the drive device (i.e., moving in the direction of separating from the recording tape cartridge 10), the leader block 30 is pulled-out from the interior of the case 12. At this time, because the front end 30A can easily ride over the central spring anchor portion 66, the leader block 30 is easily pulled-out from the interior of the case 12.

The leader block 30, which has been pulled-out from the interior of the case 12 in this way, is, while still engaged by the pull-out member 90, guided to the take-up reel of the drive device, and is accommodated in a fit-in portion (not illustrated) formed in the take-up surface of the take-up reel. Note that, at this time, the rear end 30B, which is an arc-shaped surface, of the leader block 30 forms a portion of the take-up surface, and the magnetic tape T can thereby be wound around the take-up reel of the drive device.

When the recording tape cartridge 10 is lowered by a predetermined height or the rotating shaft of the drive device is raised by a predetermined height, a releasing member (not illustrated) provided at the rotating shaft is inserted in from a pass-through hole 18A formed in the axially central portion of the reel 18. The lock mechanism which impedes inadvertent rotation is released, and the driving gear (not illustrated) formed at the rotating shaft meshes with the reel gear 28.

Accordingly, when the driving gear is driven to rotate and rotates the reel 18 synchronously with the take-up reel, the magnetic tape T is successively pulled-out from the interior of the recording tape cartridge 10 while being taken-up onto the take-up reel, and recording or playback of data (information) by a recording/playback head disposed on a predetermined tape path is carried out. It goes without saying that guide rollers (not illustrated) and the like which guide the pulled-out magnetic tape T are disposed at appropriate positions of the drive device, such that the magnetic tape T pulled-out from the recording tape cartridge 10 does not interfere with the left side edge portion of the opening 20 (i.e., the front wall 12A) at this time.

Figure 9A:
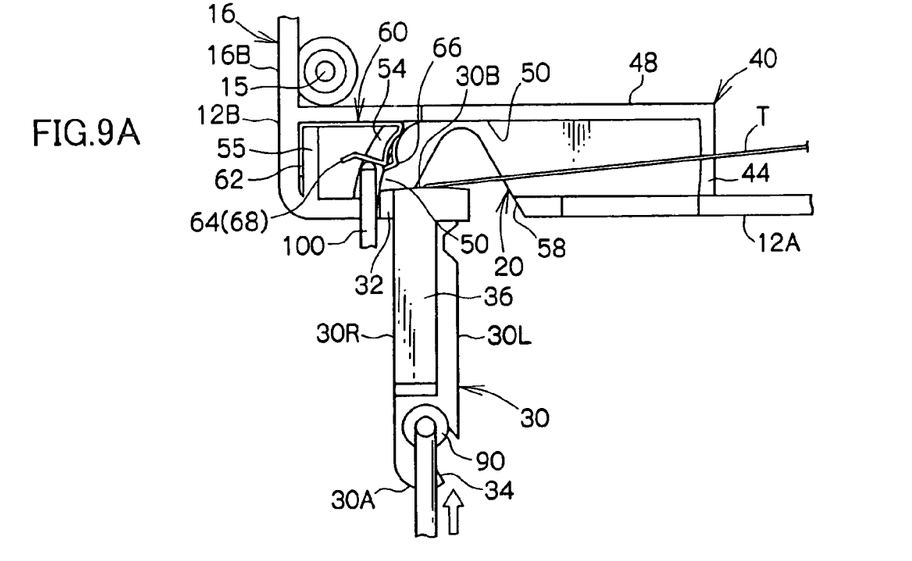
FIG. 9A is a schematic view for explaining operation, which shows a process of returning the leader block to the opening.

On the other hand, when the recording tape cartridge 10 is to be ejected from the drive device, first, the magnetic tape T is rewound onto the reel 18, and the leader block 30 is returned to the interior of the case 12 in a state of being held by the pull-out member 90. At this time, as shown in FIG. 9A for example, even if the leader block 30 is returned at a posture such that it is orthogonal to the front wall 12A, the rear end 30B of the leader block 30 is guided while slidingly contacting the guide surfaces 50 of the guide ribs 52 and 54 which stand erect at the inner side of the opening 20. Therefore, the posture of the leader block 30 is changed by 90°.

Figure 9B:
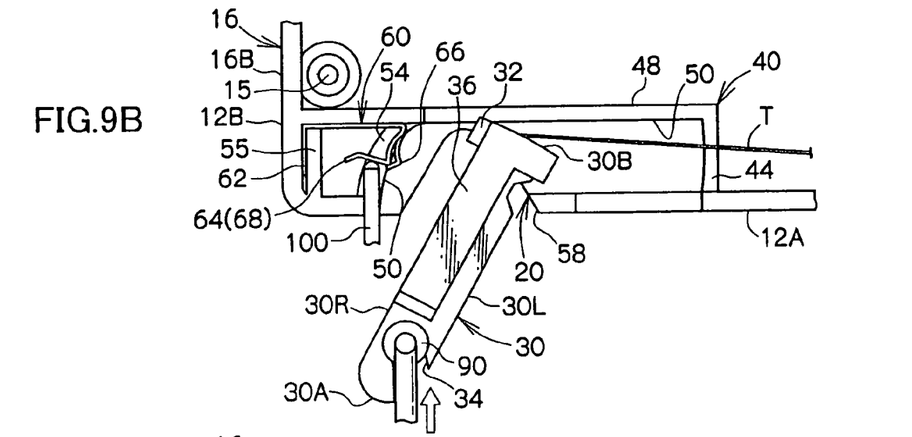
FIG. 9B is a schematic view for explaining operation, which shows the process of returning the leader block to the opening.
Figure 9C:
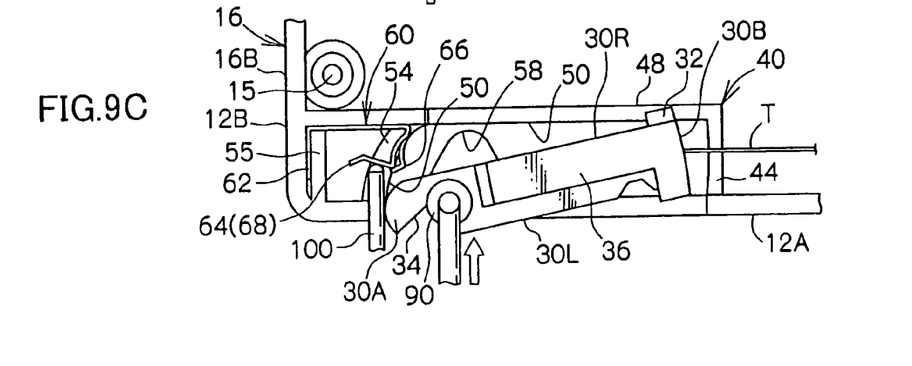
FIG. 9C is a schematic view for explaining operation, which shows the process of returning the leader block to the opening.

Namely, the guide ribs 52 and 54 stand erect in substantial arc-shapes as seen in plan view which swell toward the right wall 12B side, and are integrally continuous with the engaging ribs 46 and 48. Therefore, merely by force in one direction being applied to the leader block 30 from the pull-out member 90, as shown in FIGS. 9B and 9C, the leader block 30 is guided by the guide surfaces 50 and the posture thereof is thereby gradually corrected, such that ultimately, the leader block 30 is disposed parallel to the front wall 12A as shown in FIG. 8B. Namely, the front end 30A of the leader block 30 rides over the central spring anchor portion 66 and is anchored, and the top and bottom both end portions of the right side surface 30R abut the engaging ribs 46 and 48, and the rear end 30B abuts and fits-together with the arc-shaped surfaces of the fit-together ribs 42 and 44. The leader block 30 is thereby provisionally stopped at the inner side of the opening 20 (further toward the outer side than the position restricting portion 40).

When the leader block 30 is provisionally stopped within the case 12 in this way and the opening 20 is closed by the leader block 30, either the recording tape cartridge 10 is raised or the rotating shaft is lowered. The meshing-together of the driving gear and the reel gear 28 is cancelled, and the releasing member is pulled out from the pass-through hole 18A, and the reel 18 is locked by the locking mechanism such that the reel 18 does not rotate inadvertently. Simultaneously therewith, the positioning pins are pulled-out from the positioning holes 24 and 26, and the positioned state of the recording tape cartridge 10 with respect to the drive device is cancelled.

Thereafter, the recording tape cartridge 10 is, by an unillustrated ejecting mechanism, moved in the direction opposite to the direction of arrow A and ejected from the interior of the drive device. Accompanying this ejection operation, the releasing member 100 moves away from the spring anchor portions 64 and 68. Thus, the spring anchor portions 64 and 68, due to their own restoring forces, anchor the front end 30A of the leader block 30 more strongly than the central spring anchor portion 66 does. Inadvertent falling-out of the leader block 30 is thereby prevented.

As described above, the opening 20 of the recording tape cartridge 10 is provided at a predetermined position of the front wall 12A, i.e., at a position which is separated from a corner portion at least by a distance which is greater than or equal to the plate thickness of the case 12. Therefore, even if impact is applied to this corner portion due to a drop or the like, it is difficult for the leader block 30 to come out from the opening 20. Moreover, because the leader block 30 is pressed by the anchor member 60 by a predetermined force, it is even more difficult for the leader block 30 to come out from the opening 20. In addition, because a vicinity of this corner portion is fastened by a screw, the impact resistance is improved even more. Accordingly, the user does not worry that the leader block 30 will come out.

Further, because the leader block 30 is disposed at the inner side of the opening 20, it is difficult for the leader block 30 to be scratched or the like. Accordingly, the dimensional accuracy of the leader block 30 can always be maintained. Moreover, because the leader block 30 is disposed parallel to the front wall 12A, the size of the opening 20 can be made to be large. Accordingly, there is the advantage that the pull-out angle of the pull-out member 90 provided at the drive device can be designed freely. Namely, because the pull-out angle can be designed such that, for example, the leader block 30 is pulled-out over the shortest distance with respect to the take-up reel of the drive device, the operation of pulling-out the magnetic tape T can be completed in a short period of time.

Note that, in the recording tape cartridge of the present invention, the position restricting portion is preferably provided with a guide surface which, when the leader block returns to the interior of the case, guides the leader block such that the leader block is set at a posture parallel to the wall surface.

In this recording tape cartridge, the position restricting portion has a guide surface which, when the leader block returns to the interior of the case, guides the leader block such that the leader block is set at a posture parallel to the wall surface at the side of loading into a drive device. Therefore, merely due to the pull-out member (means) of the drive device, which is holding the leader block, applying force in one direction with respect to the recording tape cartridge, the leader block can be disposed parallel to the wall surface at the side of loading into a drive device. Namely, for example, even if the leader block is returned to the interior of the case at a posture such that the leader block is orthogonal to the wall surface at the side of loading into a drive device, the posture of the leader block can be changed by 90° by the guide surface.

Further, it is preferable that the recording tape cartridge of the above-described aspect have an anchor member which anchors the leader block which closes the opening.

This recording tape cartridge is provided with an anchor member which anchors the leader block which closes the opening. Therefore, it is even more difficult for the leader block to come out when the recording tape cartridge is not being used. Namely, even if, for example, the recording tape cartridge is dropped from a corner portion, the leader block is always pressed by the anchor member, and therefore, there is no fear that the leader block will come out of the case.

Further, in the above-described recording tape cartridge, it is preferable that the anchor member be structured by a plate spring.

In this recording tape cartridge, because the anchor member is structured by a plate spring, the structure thereof can be simplified.

In any case, in accordance with the present invention, even if impact is applied due to a drop or the like, there is no fear that the leader block will fall out from the recording tape cartridge (the case). Further, there is no fear that the leader block will be damaged.

What is claimed is:

1. A recording tape cartridge comprising:
 a case which is substantially rectangular and which rotatably accommodates a single reel on which a recording tape is wound;
 a pull-out portion formed at a wall surface of the case at a side of loading into a drive device other than at a corner portion of the case, the pull-out portion having an opening for pulling-out the recording tape;
 a leader block fixed to an end portion of the recording tape, and pulled-out by a pull-out member of the drive device, and configured to close the opening; and
 a position restricting portion configured to dispose the leader block at an inner side of the wall surface and parallel to the wall surface.

2. The recording tape cartridge of claim 1, wherein the position restricting portion has a guide surface which, when the leader block returns to an interior of the case, guides the leader block such that the leader block is set at a posture parallel to the wall surface.

3. The recording tape cartridge of claim 2, further comprising an anchor member which anchors the leader block.

4. The recording tape cartridge of claim 3, wherein the anchor member is structured by a plate spring.

5. The recording tape cartridge of claim 2, wherein the position restricting portion includes at least one guide rib, at least one engaging rib and at least one fit-together rib.

6. The recording tape cartridge of claim 1, further comprising an anchor member which anchors the leader block.

7. The recording tape cartridge of claim 6, wherein the anchor member is structured by a plate spring.

8. The recording tape cartridge of claim 7, wherein the anchor member includes an upper spring anchor portion, a middle spring anchor portion, and a lower spring anchor portion, each of which is shaped as a plate piece.

9. The recording tape cartridge of claim 8, wherein the upper spring anchor portion, the middle spring anchor portion, and the lower spring anchor portion are disposed in that order in a direction of a thickness of the case, and
 the upper spring anchor portion and the lower spring anchor portion are formed to extend longer than the middle spring anchor portion, and abut a releasing member of the drive device.

10. The recording tape cartridge of claim 8, wherein the upper spring anchor portion and the lower spring anchor portion anchor the leader block by forces which are stronger than a force by which the middle spring anchor portion anchors the leader block.

11. The recording tape cartridge of claim 1, wherein the case is formed from an upper case and a lower case.

12. The recording tape cartridge of claim 11, wherein the upper case and the lower case are joined together by screws positioned at least in the vicinity of corner portions of the case.

13. The recording tape cartridge of claim 11, wherein the upper case and the lower case are joined together by ultrasonic welding performed
 at least in the vicinity of corner portions of the case.

14. The recording tape cartridge of claim 1, wherein the pull-out portion is provided at a position which is set apart from one corner portion of the wall surface toward another corner portion at least by a length which is greater than or equal to a thickness of the case.

15. The recording tape cartridge of claim 1, wherein the leader block has a rear end which is an arc-shaped surface such that the rear end of the leader block structures a portion of a take-up surface of a take-up reel of the drive device, when the leader block is pulled-out by the pull-out member and is accommodated in a fit-in portion formed in the take-up surface.

16. The recording tape cartridge of claim 1, wherein a front end of the leader block is formed in a substantial arc-shape as seen in plan view, and
 an engaging recess which the pull-out member engages is formed in a vicinity of the front end.

17. The recording tape cartridge of claim 16, wherein the recording tape cartridge has cut-out portions which are formed at positions of a ceiling plate and a floor plate of the case which are positions corresponding to the engaging recess when the leader block closes the opening, the cut-out portions being wider than the engaging recess as seen in plan view.

18. The recording tape cartridge of claim 17, wherein the position restricting portion includes at least one guide rib, at least one engaging rib and at least one fit-together rib.

19. The recording tape cartridge of claim 1, wherein the position restricting portion includes at least one guide rib, at least one engaging rib and at least one fit-together rib.

* * * * *